Aug. 15, 1950 R. D. O'NEAL 2,518,926
RADIO FREQUENCY POWER MEASURING CIRCUIT
Filed Feb. 18, 1946
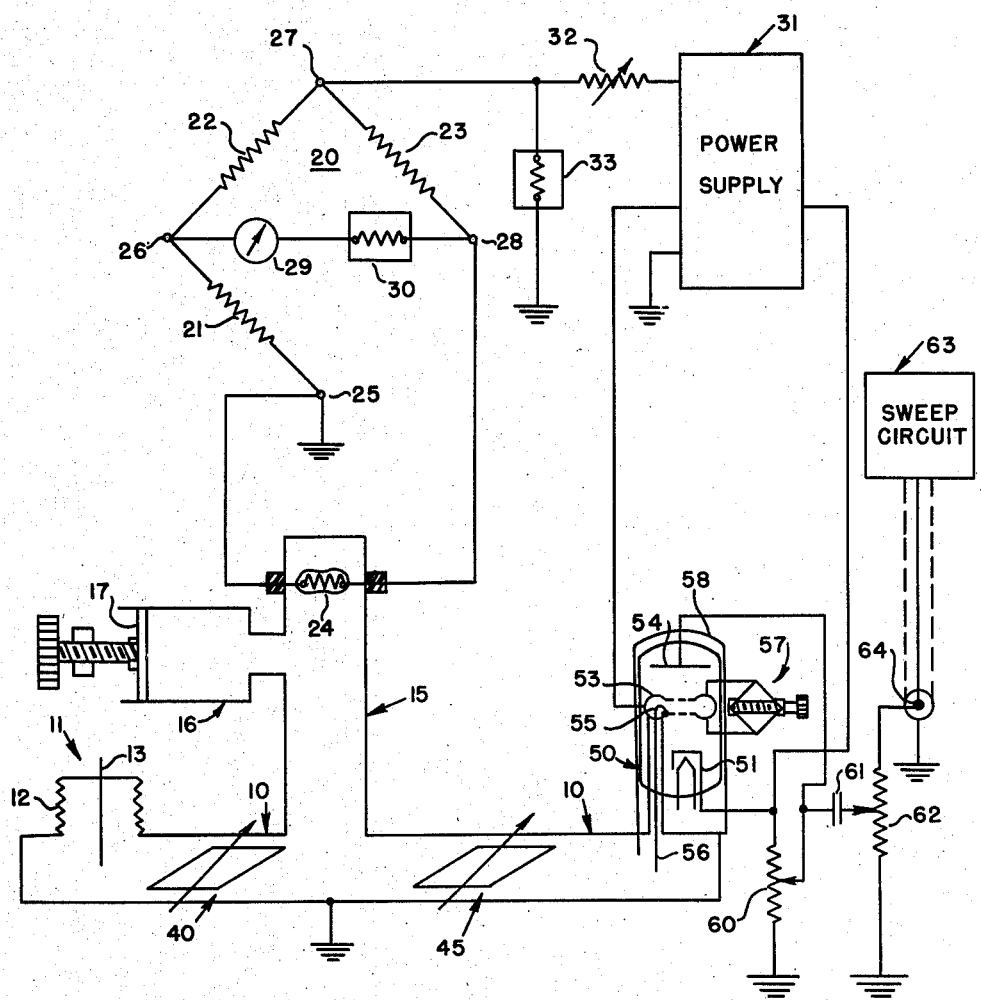
INVENTOR.
RUSSELL D. O'NEAL
BY
William D. Hall.
ATTORNEY Patented Aug. 15, 1950

2,518,926

UNITED STATES PATENT OFFICE 2,518,926

RADIO-FREQUENCY POWER MEASURING CIRCUIT

Russell D. O'Neal, Rochester, N. Y., assignor, by mesne assignments, to the United States of America as represented by the Secretary of War Application February 18, 1946, Serial No. 648,529

6 Claims. (Cl. 250—39)

This invention relates generally to electrical circuits and more particularly to radio frequency power measuring circuits.

A test set is a device for producing and accurately measuring radio frequency voltages. A test set may include an oscillator which can be modulated in some fashion, together with attenuating and metering means for accurately measuring radio frequency voltages.

In one type of test set the oscillator is frequency modulated over a band of frequencies spaced about a center frequency. The frequency modulating means may include a reactance tube in the parallel resonant circuit of the oscillator, the effective reactance of this tube being varied in a predetermined cyclic manner. The highest frequency at which a reactance tube will operate satisfactorily is limited. Accordingly, one object of this invention is to provide a frequency modulated test set capable of generating and metering radio frequency signals at ultra high frequencies.

In addition to supplying a calibrated frequency modulated signal, a test set is adapted to perform a number of functions, such as measuring the frequency and the power level of an input radio frequency signal, the frequency spectrum of a voltage pulse, and factors associated with the system performance of a radio receiver. Another object of this invention, therefore, is to provide a frequency modulated test set entailing the characteristics cited above.

Other objects, features and advantages of this invention will suggest themselves to those skilled in the art and will become apparent from the following description of the invention taken in connection with the accompanying circuit diagram which schematically illustrates an arrangement embodying the principles of this invention.

As shown in the figure, power is applied to or taken from wave guide 10 through adapter 11. Adapter 11 includes an outer conductor 12 with a screw base attached to the wave guide and an inner conductor 13 projecting down inside the wave guide and spaced approximately one-quarter wavelength of the wave guide frequency from the end of the guide.

Spaced from adapter 11 and away from the end of the wave guide 10 a second wave guide 15 is joined to wave guide 10 to for a T-type junction.

Connected to wave guide 15 and spaced approximately a half wavelength of the wave guide frequency from the T-junction is an absorption type frequency meter 16. This frequency meter is a cylindrical cavity, one of whose end plates 17 is movable so that the length and volume of the cavity may be adjusted. When the cavity is one-half wavelength long at a frequency applied thereto, it resonates and absorbs more power from the wave guide than it does at other frequencies.

Temperature-sensitive element 24 is suspended within wave guide 15, spaced from the frequency meter and away from the T-junction, at a point which is approximately equal to one-quarter wavelength from the end of guide 15.

The temperature-sensitive resistor 24 is connected into a power measuring circuit 20. Power measuring circuit 20 may be of a Thermistor bridge type described in the copending patent application by Rudolph N. Griesheimer, Serial No. 604,031, filed July 9, 1945, now Patent No. 2,465,683.

The Thermistor bridge includes three equal and fixed resistors 21, 22, and 23 and a temperature-sensitive resistor 24 connected between terminals 25 and 26, 26 and 27, 27 and 28, and 28 and 25, respectively, of the bridge. Connected between terminals 26 and 28 is a microammeter 29 in series with a sensitivity compensation network 30. Microammeter 29 will hereinafter be referred to as power meter 29.

A direct voltage is supplied by power supply 31 through variable zero-set resistance 32 to terminals 25 and 27 of the bridge.

A zero drift compensated network 33 is connected between terminals 25 and 27 of the bridge.

The Thermistor bridge 20 measures power by means of the temperature-sensitive resistive element 24, known as a Thermistor. A Thermistor element is a substance including nickel, manganese, and cobalt. The resistance of the Thermistor decreases with increasing temperature. Changes of the Thermistor temperature and hence resistance may be caused by ambient temperature changes, by A. C. or D. C. current flowing through it, or by the absorption of radio frequency power. The bead type Thermistor is small in mass and is characterized by being sensitive to the changes mentioned above.

Wave guide 15 together with its component parts and with the power measuring circuit 20 will hereinafter be referred to as the power monitoring circuit.

Calibrated attenuator 40 is placed within wave guide 10 between adapter 11 and the T-joint. This calibrated attenuator consists of a resistive strip cut in the shape shown in the figure. The position of the strip may be adjusted from one side of the wave guide to the center by a pair of rods driven by a cam attached to the attenuator control. The attenuation increases as the strip moves towards the center of the wave guide since the electric field strength increases toward the center.

A local oscillator comprising a vacuum tube 50 is mounted on wave guide 10, being spaced from the T-junction and away from the adapter 11. For ultra high frequencies the oscillator tube 50 may be of the velocity-modulated reflex type (Shepher-Pierce tube), which type is shown in the figure. Shield can 58 surrounds vacuum tube 50. Oscillator tube 50 includes a cathode 51, resonator cavity 53, and reflector anode 54. Energy is taken from the resonator cavity 53 by means of a conductor 55 projecting therein and extending down inside wave guide 10 to form a probe 56. Probe 56 is spaced approximately one-quarter of the guide wavelength at a center frequency from the end of the wave guide of the oscillator 50.

The reflex, velocity-modulated tube 50 may be tuned by electrical or mechanical means. In the mechanical adjustment the space between the grids of the resonant cavity may be varied by means of a tuning screw 57 to afford a coarse adjustment of frequency. The second method of tuning is obtained by adjusting the voltage applied to the reflector anode, as will be explained.

A suitable positive potential is taken from power supply 31 and applied to resonator cavity 53. A second positive potential is also taken from power supply 31 and applied to cathode 51. Cathode 51 of oscillator tube 50 is returned through potentiometer 60 to ground.

From the variable tap of a potentiometer 60 is derived a direct voltage which is applied to reflector anode 54 of local oscillator 50. Potentiometer 60 will hereinafter be referred to as a frequency adjusting control.

Power set attenuator 45 is spaced within wave guide 10 between the T-junction and the oscillator tube 50. Power set attenuator 45 is used to adjust the fraction of the power output of the oscillator tube which is conducted to the power monitoring circuit and to an external circuit. The attenuator consists of a relatively thin resistive strip cut in the shape of a parallelogram. Since the electric field strength varies from maximum at the center of the guide to zero at the edges, the power dissipated in the resistive strip increases as the strip is moved towards the center of the guide.

An external signal voltage of a sawtooth configuration from a suitable sweep circuit 63 is applied through sweep input plug 64 to potentiometer 62. The variable tap of potentiometer 62 is connected through a coupling condenser 61 to the variable tap of potentiometer 60. Potentiometer 62 will hereinafter be referred to as a signal width adjustment control 62. Sweep circuit 63 may be a generator contained within the test set or it may be a sawtooth sweep voltage derived from any suitable source. For instance it may be obtained from the sweep circuit of a cathode ray oscilloscope, or, when used in testing a pulsed radar system, from any suitable generator of the radar system which is synchronized with the system.

The embodiment of the frequency-modulated test set shown in the figure consists essentially of a local oscillator 50, a power monitoring circuit, a calibrated attenuator 40, a reactance type frequency meter 16, a power set attenuator 45 and associated radio frequency plumbing. The voltage having a sawtooth waveform is applied through the sweep input plug 64 to the reflector anode 54 of the oscillator 50, the D. C. potential of which is set by the phase control adjustment. As a result the frequency of the local oscillator output is modulated about a center frequency which is determined by the D. C. reference potential. The amount by which the center frequency is modulated on either side of the center frequency is controlled by the signal width adjustment 62.

The signal width control 62 varies the slope and the amplitude of the sawtooth voltage sweep applied to the reflector anode 54. Since the frequency of oscillation in one anode of operation for an oscillator of the type described is proportional to the reflector voltage, the output of the local oscillator 50 is frequency modulated in a sawtooth fashion.

The local oscillator output is passed through the power set attenuator 45 to the T-junction at which point there is a power division, one portion of the power going to the Thermistor bead 24 in the power monitor circuit. Between the T-junction and the Thermistor bead there is another junction which couples power to the frequency meter cavity 16 when the cavity is tuned to resonance. When not tuned to resonance, little radio frequency power is coupled into the cavity. When radio frequency power is absorbed by the Thermistor bead 24, its temperature increases, its resistance decreases, and the bridge becomes unbalanced. The resulting current flow is directly proportional to the radio frequency power absorbed.

The other portion of the power continues on in the main wave guide 10 through the calibrated attenuator 40. For power output measurement of the test set, the calibrated attenuator 40 may be marked in decibels below one milliwatt output when the power set adjustment 45 is set for full scale deflection of the power meter 29.

For measuring power input to the test set an index mark is placed on the calibrated attenuator 40 to indicate the setting of the attenuator for which a full scale deflection of the power meter 29 will be produced in response to a given power input to the test set. With an input other than the given power input the number of divisions between the index mark and a point to which the calibrated attenuator 40 must be set for full scale deflection of the power meter 29 is proportional to the power level above or below the given power input to the test set. This test set is particularly adapted to measuring the power level of a series of voltage pulses. For such measurements the frequency modulating cycle would be synchronized with the series of pulses.

The bridge is balanced with zero radio frequency power applied to the Thermistor bead 24, by adjusting the zero set resistance 32, which varies the current flowing into the bridge 20 and therefore to the Thermistor bead 24.

To eliminate frequent resettings of the zero set adjustment 32 due to changes in the ambient temperature of the Thermistor bead 24, the bridge 20 is provided with the sensitivity compensating network 30 and the zero drift compensating network 33, the elements of which are disclosed in greater detail in the aforesaid copending application. The sensitivity compensation network 30 adjusts the effective series meter resistance as the temperature changes. The zero drift compensating network 33 alters the total current flowing into bridge network 20 when the ambient temperature changes.

The frequency of an input signal may be determined by first adjusting the calibrated attenuator 40 so that a reading appears on the power meter 29. When the adjustable end wall of the frequency meter 16 is properly adjusted, the needle of the power meter 29 will dip slightly and the frequency may be read on an engraved dial attached to the adjustable end.

The frequency spectrum of a voltage pulse may be determined by first synchronizing the sweep signal with the voltage pulses and varying the resonant frequency of the frequency meter while noting the relative amplitude of the power meter reading for each frequency.

It will be evident to those skilled in the art that the present invention may be adapted to perform a variety of other functions, such as determining the sensitivity of a radio receiver, the receiver bandwidth, the performance of the automatic frequency control circuits in a receiver, and the condition of the various portions of the transmission line components in electrical apparatus.

While there has been described what is at present considered to be the preferred embodiment of this invention, it will be obvious to those skilled in the art that various changes and modifications may be made therein without departing from the scope of the invention as set forth in the appended claims.

What is claimed is:

1. In combination, an electrical measuring circuit, first and second wave guide sections joined together to form a T-section, means for applying a radio frequency signal to one end of said first wave guide, variable attenuating means coupled to said first wave guide, for adjusting the power level of said radio frequency signal to a calibrated level, oscillator means for generating a second radio frequency signal, means for frequency modulating said second radio frequency signal over a controllable band of frequencies to produce a frequency-modulated signal, means for applying said frequency-modulated signal to the opposite end of said first wave guide, second variable attenuating means for controlling the power level of said frequency-modulated signal, said first radio frequency signal coacting with said frequency-modulated signal to produce a combined frequency signal in said second wave guide, means including a temperature-sensitive resistive element for measuring and indicating the power level of said combined frequency signal, and means coupled to said second wave guide for indicating the value of frequency of said combined frequency signal in said second wave guide.

2. In combination, an electrical measuring circuit, a first wave guide section, means for applying a radio frequency signal to one end of said first wave guide, attenuating means coupled within said first wave guide for adjusting the power level of said radio frequency signal, oscillator means for generating a second radio frequency signal, means for frequency modulating said second radio frequency signal, means for applying said frequency-modulated signal to the opposite end of said first wave guide, second attenuating means for controlling the power level of said frequency modulated signal, a second wave guide joined to said first wave guide between said first and second attenuating means, and means coupled to said second wave guide for indicating the power level of the radio frequency energy therein.

3. In combination, an electrical measuring circuit, first and second wave guide sections joined to form a T-section, means for applying a radio frequency signal to one end of said first wave guide, means for attenuating by a calibrated amount said radio frequency signal, a frequency-modulated oscillator means for producing a frequency-modulated signal, means for applying said frequency-modulated signal to the opposite end of said first wave guide, means for attenuating said frequency modulated signal in said first wave guide, and means coupled to said second wave guide for indicating the power level of said radio frequency signal within said second wave guide.

4. In combination, an electrical measuring circuit, means for applying a radio frequency signal to said circuit, means for attenuating by a calibrated amount said radio frequency signal, a frequency-modulated oscillator means for generating a frequency-modulated signal, means for attenuating said frequency-modulated signal, means for combining said attenuated radio frequency signal and said attenuated frequency-modulated signal to produce a combined frequency signal, and means for indicating the power level of said combined frequency signal.

5. In combination, an electrical measuring circuit, first and second waveguide sections joined to form a T section, means for applying a radio frequency signal to one end of said first waveguide, means for attenuating by a calibrated amount said radio frequency signal, a frequency modulated oscillating means for producing a frequency modulated signal, means for applying said frequency modulated signal to the opposite end of said first waveguide, means for attenuating said frequency modulated signal in said first waveguide, and means coupled to said second waveguide for indicating the frequency spectrum of said radio frequency signal within said second waveguide.

6. In combination, an electrical measuring circuit, means for applying a radio frequency signal to said circuit, means for attenuating by a calibrated amount said radio frequency signal, a frequency modulated oscillator means for generating a frequency modulated signal, means for attenuating said frequency modulated signal, means for combining said attenuated radio frequency signal, and said attenuated frequency modulated signal to produce a combined frequency signal, and means for indicating the frequency spectrum of said radio frequency signal.

RUSSELL D. O'NEAL.

REFERENCES CITED

The following references are of record in the file of this patent:

UNITED STATES PATENTS

| Number | Name | Date |
| --- | --- | --- |
| 2,337,328 | Hathaway | Dec. 21, 1943 |
| 2,339,198 | Smith | Jan. 11, 1944 |
| 2,393,717 | Speaker | Jan. 29, 1946 |
| 2,410,840 | Samuel | Nov. 12, 1946 |
| 2,411,553 | Ramo | Nov. 26, 1946 |
| 2,417,820 | Ginzton | Mar. 25, 1947 |
| 2,434,334 | Sheppard | Jan. 13, 1948 |

OTHER REFERENCES

Electronics Dictionary, Cooke and Marcus, McGraw-Hill Book Co. (1945), page 230. (Copy in Scientific Library.)